(12) United States Patent
Wang

(10) Patent No.: US 8,089,268 B2
(45) Date of Patent: Jan. 3, 2012

(54) APPARATUS AND METHOD FOR REMOVING ANISOTROPY EFFECT FROM DIRECTIONAL RESISTIVITY MEASUREMENTS

(75) Inventor: Tsili Wang, Katy, TX (US)

(73) Assignee: Smith International, Inc., Houston, TX (US)

( * ) Notice: Subject to any disclaimer, the term of this patent is extended or adjusted under 35 U.S.C. 154(b) by 463 days.

(21) Appl. No.: 12/410,153

(22) Filed: Mar. 24, 2009

(65) Prior Publication Data

US 2010/0244842 A1    Sep. 30, 2010

(51) Int. Cl.
*G01V 3/18* (2006.01)
(52) U.S. Cl. ............... 324/200; 324/338; 324/339
(58) Field of Classification Search .......... 324/2
See application file for complete search history.

(56) References Cited

U.S. PATENT DOCUMENTS

| | | | |
|---|---|---|---|
| 5,045,795 A | 9/1991 | Gianzero et al. | |
| 5,329,448 A | 7/1994 | Rosthal | |
| 5,869,968 A * | 2/1999 | Brooks et al. ............... | 324/338 |
| 6,181,138 B1 | 1/2001 | Hagiwara et al. | |
| 6,297,639 B1 | 10/2001 | Clark et al. | |
| 6,509,738 B1 | 1/2003 | Minerbo et al. | |
| 6,556,015 B1 | 4/2003 | Omeragic et al. | |
| 6,566,881 B2 | 5/2003 | Omeragic et al. | |
| 6,573,722 B2 | 6/2003 | Rosthal et al. | |
| 6,819,110 B2 | 11/2004 | Omeragic et al. | |
| 6,836,218 B2 | 12/2004 | Frey et al. | |
| 6,903,553 B2 | 6/2005 | Itskovich et al. | |
| 6,911,824 B2 | 6/2005 | Bittar | |
| 6,937,022 B2 | 8/2005 | Itskovich et al. | |
| 6,969,994 B2 | 11/2005 | Minerbo et al. | |
| 6,998,844 B2 | 2/2006 | Omeragic et al. | |
| 7,003,401 B2 | 2/2006 | Haugland | |
| 7,019,528 B2 | 3/2006 | Bittar | |
| 7,038,457 B2 | 5/2006 | Chen et al. | |
| 7,057,392 B2 | 6/2006 | Wang et al. | |
| 7,138,803 B2 | 11/2006 | Bittar | |
| 7,265,552 B2 | 9/2007 | Bittar | |
| 7,269,515 B2 | 9/2007 | Tabarovsky et al. | |
| 7,274,991 B2 | 9/2007 | Tabarovsky et al. | |
| 7,286,091 B2 | 10/2007 | Chen et al. | |

(Continued)

FOREIGN PATENT DOCUMENTS

EP    0715188 A2    6/1996

OTHER PUBLICATIONS

International Search Report and Written Opinion dated Nov. 29, 2010 for corresponding PCT application No. PCT/US2010/028451 filed Mar. 24, 2010.

(Continued)

*Primary Examiner* — Patrick J Assouad
*Assistant Examiner* — Vincent P Spinella Mamo

(57) ABSTRACT

A directional resistivity tool includes at least one receiver deployed axially asymmetrically between at least one pair of transmitters. The transmitters are configured to transmit electromagnetic waves at first and second correspondingly distinct frequencies $f_1$ and $f_2$ such that: $f_1/f_2 = L_2/L_1$, where $L_1$ and $L_2$ represent the corresponding axial distances between the first and second transmitters and the receiver. Exemplary embodiments of the invention further include a method for reducing the near-bed anisotropy effect. The anisotropy effect may be advantageously reduced (or removed) while at the same time providing for freedom in selecting the axial transmitter and receiver spacing.

34 Claims, 4 Drawing Sheets

U.S. PATENT DOCUMENTS

| | | |
|---|---|---|
| 7,345,487 B2 | 3/2008 | Bittar et al. |
| 7,353,613 B2 | 4/2008 | Bartel et al. |
| 7,385,400 B2 | 6/2008 | Moore |
| 7,414,407 B2 | 8/2008 | Wang et al. |
| 7,436,184 B2 | 10/2008 | Moore |
| 7,463,035 B2 | 12/2008 | Merchant et al. |
| 7,471,088 B2 | 12/2008 | Yu et al. |
| 2003/0057950 A1 | 3/2003 | Gao et al. |
| 2005/0083063 A1* | 4/2005 | Omeragic et al. ............ 324/338 |
| 2005/0140373 A1* | 6/2005 | Li et al. .......................... 324/338 |
| 2006/0033502 A1* | 2/2006 | Bittar ............................ 324/336 |
| 2006/0255810 A1 | 11/2006 | Yu et al. |
| 2008/0068022 A1 | 3/2008 | Peter et al. |
| 2008/0074336 A1 | 3/2008 | Signorelli et al. |
| 2008/0078580 A1 | 4/2008 | Bittar |
| 2008/0158082 A1 | 7/2008 | Wang et al. |
| 2008/0246486 A1 | 10/2008 | Forgang et al. |
| 2010/0123462 A1* | 5/2010 | Bittar ............................ 324/369 |

OTHER PUBLICATIONS

Fang, S., et al.; "Determination of structural dip and azimuth from LWD azimuthal propagation resistivity measurements in anisotropic formations". 2008 SPE Annual Technical Conference and Exhibition, Denver, CO, Sep. 21-24, 2008.

\* cited by examiner

APPARATUS AND METHOD FOR REMOVING ANISOTROPY EFFECT FROM DIRECTIONAL RESISTIVITY MEASUREMENTS

RELATED APPLICATIONS

None.

FIELD OF THE INVENTION

The present invention relates generally to downhole measurement tools utilized for measuring electromagnetic properties of a subterranean borehole. More particularly, embodiments of this invention relate to a directional resistivity tool having at least one receiving antenna deployed axially asymmetrically between at least one pair of transmitting antennae.

BACKGROUND OF THE INVENTION

The use of electrical measurements in prior art downhole applications, such as logging while drilling (LWD), measurement while drilling (MWD), and wireline logging applications is well known. Such techniques may be utilized to determine a subterranean formation resistivity, which, along with formation porosity measurements, is often used to indicate the presence of hydrocarbons in the formation. For example, it is known in the art that porous formations having a high electrical resistivity often contain hydrocarbons, such as crude oil, while porous formations having a low electrical resistivity are often water saturated. It will be appreciated that the terms resistivity and conductivity are often used interchangeably in the art. Those of ordinary skill in the art will readily recognize that these quantities are reciprocals and that one may be converted to the other via simple mathematical calculations. Mention of one or the other herein is for convenience of description, and is not intended in a limiting sense.

Directional resistivity measurements are also commonly utilized to provide information about remote geological features (e.g., remote beds, bed boundaries, and/or fluid contacts) not intercepted by the measurement tool. Such information includes, for example, the distance from and direction to the remote feature. In geosteering applications, directional resistivity measurements may be utilized in making steering decisions for subsequent drilling of the borehole. For example, an essentially horizontal section of a borehole may be routed through a thin oil bearing layer. Due to the dips and faults that may occur in the various layers that make up the strata, the distance between a bed boundary and the drill bit may be subject to change during drilling. Real-time distance and direction measurements may enable the operator to adjust the drilling course so as to maintain the bit at some predetermined distance from the boundary layer. Directional resistivity measurements also enable valuable geological information to be estimated, for example, including the dip and strike angles of the boundary as well as the vertical and horizontal conductivities of the formation.

Methods are known in the art for making directional LWD measurements. For example, LWD directional resistivity tools commonly measure or estimate a magnetic cross-component (e.g., the $H_{zx}$ component) of the electromagnetic radiation as the tool rotates in the borehole (e.g., during drilling). Various tool configurations are known in the art for measuring such cross components. For example, U.S. Pat. No. 6,181,138 to Hagiwara teaches a method that employs an axial transmitter antenna and three co-located, circumferentially offset tilted receiver antennae. U.S. Pat. No. 6,969,994 to Minerbo et al., U.S. Pat. No. 7,202,670 to Omeragic et al., and U.S. Pat. No. 7,382,135 to Li et al teach a method that employs an axial transmitter antenna and two axially spaced tilted receiver antennae. The receiver antennae are further circumferentially offset from one another by an angle of 180 degrees. U.S. Pat. Nos. 6,476,609, 6,911,824, 7,019,528, 7,138,803, and 7,265,552 to Bittar teach a method that employs an axial transmitter antenna and two axially spaced tilted receiver antennae in which the tilted antennae are tilted in the same direction. U.S. Pat. Nos. 7,057,392 and 7,414,407 to Wang et al teach a method that employs an axial transmitter antenna and two longitudinally spaced transverse receiver antennae.

As is known to those of ordinary skill in the art, electrically anisotropic reservoir formations are commonly encountered during drilling. Directional resistivity measurements are sensitive not only to remote geological features such as bed boundaries, but also to the electrical properties of an electrically anisotropic near-bed (the bed in which the measurement tool resides). In particular, a homogeneous, electrically anisotropic near-bed often produces directional resistivity measurements that are similar to that of a remote geological feature. This "anisotropy effect", if not properly accommodated can interfere with the use of directional resistivity measurements in the detection and/or characterization of a remote target. Likewise, the presence of a remote geological feature can also interfere with the proper characterization of the electrical properties of the near-bed (e.g., the determination of the vertical and horizontal conductivities of the formation).

One known technique for removing the above-described near-bed anisotropy effect involves the use of a pair of transmitter antennae deployed axially symmetrically about a receiver or receiver pair. The transmitters are typically fired sequentially. One of the received signals is then subtracted from the other in order to reduce the anisotropy effect. While this technique may be commercially serviceable, there is a need for further improvement.

SUMMARY OF THE INVENTION

Aspects of the present invention are intended to address the above described need for improved directional resistivity tools. In one aspect the invention includes a directional resistivity tool having at least one receiver deployed axially asymmetrically between at least one pair of transmitters. The transmitters are configured to transmit electromagnetic waves at first and second correspondingly distinct frequencies $f_1$ and $f_2$ such that: $f_1/f_2 = L_2^2/L_1^2$, where $L_1$ and $L_2$ represent the corresponding axial distances between the first and second transmitters and the receiver. Exemplary embodiments of the invention further include a method for reducing the near-bed anisotropy effect. The method includes processing a difference between $L_1^3 \cdot H_{zx1}$ and $L_2^3 \cdot H_{zx2}$ where $H_{zx1}$ and $H_{zx2}$ represent the measured magnetic fields at the receiver from the first and second transmitters. The magnetic fields may be derived, for example, from the voltage responses measured with the coil antennae and normalized by the respective frequencies and the antenna moments.

Exemplary embodiments of the present invention may advantageously provide several technical advantages. For example, the invention may advantageously enable the aforementioned anisotropy effect to be significantly reduced (or even fully removed) while at the same time providing for freedom in selecting the transmitter and receiver antennae spacing. Moreover, the invention advantageously provides for a reduction in tool length as compared to conventional symmetric tools, which may enable other sensors to be deployed closer to the bit.

In one aspect the present invention includes a downhole measurement tool. The tool includes a tool body and a pair of transmitting antennae deployed about the tool body. A receiving antenna is deployed about the tool body axially asymmetrically between the pair of transmitting antenna. The first and second transmitting antenna (that make up the pair) are configured to transmit electromagnetic waves at correspondingly distinct first and second frequencies such that: $f_1/f_2=L_2^2/L_1^2$, where $f_1$ and $f_2$ represent the first and second frequencies and $L_1$ and $L_2$ represent axial distances between the receiver antenna and the first and second transmitter antennae.

In another aspect, this invention includes a downhole measurement tool. The tool includes a tool body and first and second axially spaced receiving antennae deployed about the tool body. A first pair of transmitting antennae is deployed about the tool body. The first pair includes first and second transmitting antennae deployed axially asymmetrically about a location between the first and second receiving antennae. The first transmitting antenna is configured to transmit electromagnetic waves at a first frequency and the second transmitting antenna is configured to transmit electromagnetic waves at a second frequency such that $f_1/f_2=L_2^2/L_1^2$, where $f_1$ and $f_2$ represent the first and second frequencies and $L_1$ and $L_2$ represent axial distances between the first and second transmitting antennae and the location between the first and second receiving antennae.

In still another aspect, the invention includes a downhole measurement tool. The tool includes a tool body and first and second axially spaced receiving antennae deployed about the tool body. A first pair of transmitting antennae is also deployed about the tool body. The first pair includes first and second transmitting antennae deployed axially asymmetrically about the first and second receiving antennae. The first transmitting antenna is configured to transmit electromagnetic waves having at least first and second frequency components and the second transmitting antenna is configured to transmit electromagnetic waves having at least third and fourth frequency components such that $f_{11}/f_{21}=L_{21}^2/L_{11}^2$ and $f_{12}/f_{22}=L_{22}^2/L_{12}^2$, where $f_{11}$, $f_{12}$, $f_{21}$ and $f_{22}$ represent the first, second, third, and fourth frequencies components, $L_{11}$ and $L_{12}$ represent the axial distances between the first transmitting antenna and the first and second receiving antennae, and $L_{21}$ and $L_{22}$ represent the axial distances between the second transmitting antenna and the first and second receiving antennae.

In yet another aspect, the present invention includes a method of making directional resistivity measurements in a subterranean borehole. The method includes rotating a directional resistivity tool in the borehole. The directional resistivity tool includes a receiving antenna deployed axially between first and second transmitting antennae. The first and second transmitting antennae are asymmetrically spaced about the receiver such that: $L_1 \neq L_2$, (where $L_1$ and $L_2$ represent axial distances between the receiving antenna and the corresponding first and second transmitting antennae). The method further includes causing the first and second transmitting antennae to transmit first and second electromagnetic waves at corresponding first and second distinct frequencies $f_1$ and $f_2$ such that $f_1/f_2=L_2^2/L_1^2$ and causing the receiving antenna to measure first and second magnetic fields corresponding to the first and second electromagnetic waves.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
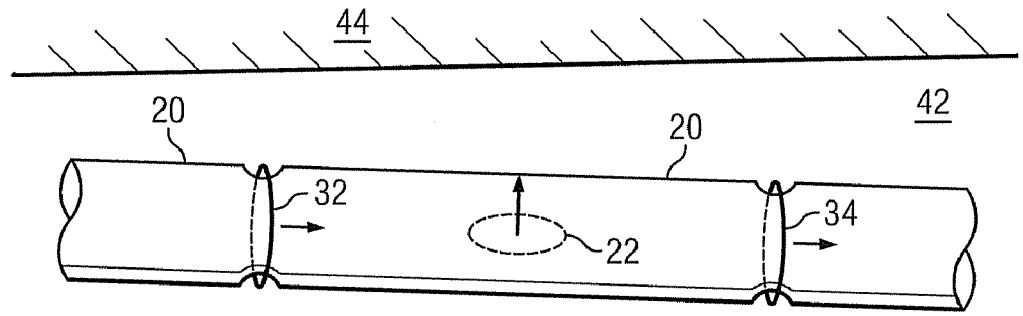
FIG. 1 depicts a prior art directional resistivity tool.

FIG. 1 depicts a prior art resistivity tool 20 for making directional resistivity measurements in a subterranean borehole. The tool includes first and second axial transmitting antennae 32 and 34 deployed symmetrically about a transverse receiving antenna 22. As is known to those of ordinary skill in the art, a time varying electric current (an alternating current) in one or both of the transmitting antenna 32 and 34 produces a corresponding time varying magnetic field in the formation which in turn induces electrical currents (eddy currents) in the conductive formation. The eddy currents further produce secondary magnetic fields which may produce a voltage response in the receiving antenna 22. The measured voltages in the receiving antennae can be processed, as is known to those of ordinary skill in the art, to obtain a measurement of the secondary magnetic field, which may in turn be further processed to estimate formation resistivity and dielectric constant. These electrical formation properties can be further related to the hydrocarbon bearing potential of the formation.

As described above in the Background Section, one or more cross-components may be used in making directional resistivity measurements (e.g., in geosteering operations). The $H_{zx}$ cross-component is commonly used and is defined as the transverse reception (i.e., the x-mode reception) of an axially transmitted electromagnetic wave (a z-mode transmission). The $H_{zx}$ cross-component may be obtained, for example, using the prior art tool embodiment depicted on FIG. 1, wherein an axial electromagnetic wave is transmitted using one or both of transmitting antenna 32 and 34 and a transverse electromagnetic wave is received using transverse receiver antenna 22. As also described in the Background Section, it is well known that the $H_{zx}$ component may be obtained using either a conventional transverse receiver antenna (e.g., receiver 22 depicted on FIG. 1) or a conventional tilted receiver antenna. Suitable downhole tools in accordance with the present invention may therefore include one or more of either or both transverse receiving antennae and/or tilted receiving antennae. The present invention is expressly not limited this regard.

Figure 2:
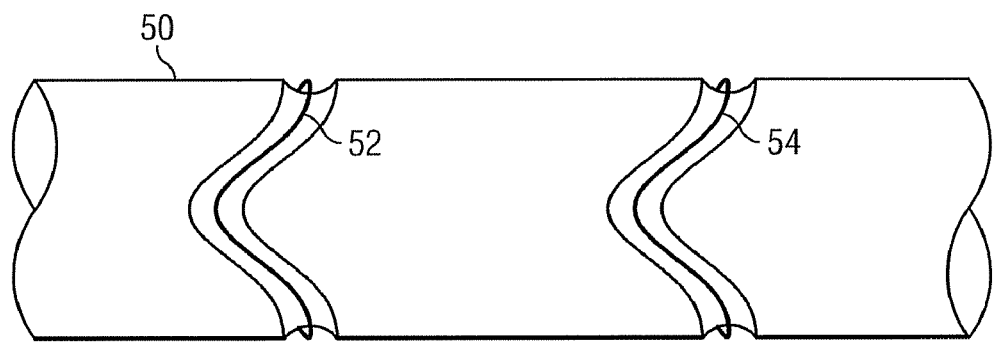
FIG. 2 depicts a directional resistivity tool employing first and second non-planar antenna.

With reference now to FIG. 2, the $H_{zx}$ cross-component may also be obtained using one or more non-planar antennae. FIG. 2 depicts a measurement tool 50 including first and second non-planar antennae 52 and 54. In the exemplary embodiment depicted, antenna 52 is configured as an axial transmitter (i.e., for transmission of z-mode radiation) while antenna 54 is configured as a transverse receiver (i.e., for reception of x-mode radiation). Such non-planar antennae are disclosed in commonly invented, commonly assigned, and co-pending U.S. patent application Ser. No. 12/409,655, which is hereby fully incorporated by reference. A suitable downhole tool in accordance with the present invention may include at least one non-planar receiving antenna configured for receiving transverse (x-mode) electromagnetic radiation. Moreover, the downhole tool may further include at least one non-planar transmitting antenna configured for transmitting axial (z-mode) electromagnetic radiation.

In the development of subterranean reservoirs, it is common to drill boreholes at a predetermined distance from a bed boundary or a fluid contact within the reservoir. With reference again to FIG. 1, directional resistivity measurements are commonly utilized to provide information about remote geological targets not intercepted by the measurement tool (e.g., the location of remote beds 44 and 46 or of various fluid contacts). Such information may include, for example, the distance and direction to the remote target. Directional resistivity measurements also provide information about the conductivity of the near-bed 42 (the bed in which the tool resides). As described above in the Background Section, the measured electrical response of an anisotropic near-bed is often similar to that of a remote bed boundary (e.g., varying sinusoidally with azimuth angle about the circumference of the tool/borehole). The prior art teaches that the use of a transmitter pair (or pairs) symmetrically spaced about one or more receivers may enable a remote bed to be distinguished from a near-bed having anisotropic electrical properties. Symmetric transmitting antennae 32 and 34 produce remote bed electrical responses having opposite signs (i.e., the response from one is positive and the other negative). Symmetric transmitting antennae 32 and 34, when located in a homogeneous, anisotropic formation produce electrical responses having the same sign. Subtracting the two responses therefore results in an enhancement of the remote bed effect (the remote bed response) and a reduction (or even an elimination) of the anisotropy effect (the near-bed response). While symmetric transmitters have been utilized in commercial directional resistivity measurements, their use increases the tool length by approximately a factor of two (as compared with a tool including a single transmitter and receiver). Such increased length can be disadvantageous in that it results in other sensors in the BHA being further from the drill bit.

It will be appreciated that the terms transmitting antenna and transmitter are used synonymously and interchangeably herein. The terms receiving antenna and receiver are also used synonymously and interchangeably.

Figure 3:
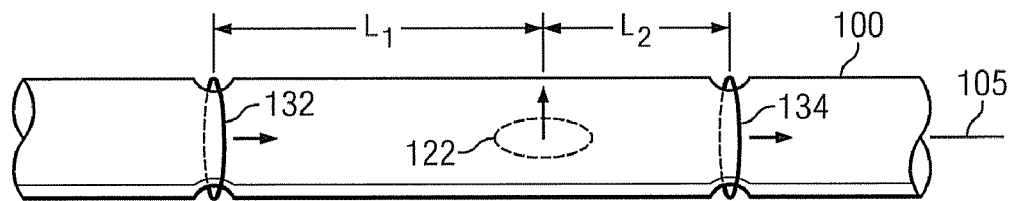
FIG. 3 depicts one exemplary embodiment of a directional resistivity tool in accordance with the present invention.

With reference now to FIG. 3, one exemplary embodiment of a measurement tool 100 in accordance with the present invention is depicted. In the exemplary embodiment shown, measurement tool 100 includes first and second axial transmitting antennae 132 and 134 deployed axially asymmetrically about a transverse receiver 122. Transmitting antenna 132 is axially spaced from the receiving antenna 122 by a distance $L_1$, while transmitting antenna 134 is axially spaced from the receiving antenna 122 by a distance $L_2$.

It will be appreciated that the depiction of the invention in FIG. 3 having orthogonal antennae with one of the axes (antenna moments) parallel to the tool axis 105 is for illustrative purposes only. As described above, one or more of the transmitting and/or receiving antennae may be inclined at an angle other than 0 or 90 degrees with respect to the tool axis 105. Moreover, the transmitting antennae and the receiving antenna need not be orthogonal. As is known to those of ordinary skill in the art, one or more of the cross-components can be determined, e.g., via rotating or projecting the measurement onto orthogonal axes.

It will further be appreciated that the invention is not limited to embodiments employing a single pair of transmitting antennae. Those of ordinary skill in the art will readily appreciate that multiple pairs of asymmetrically spaced transmitting antennae may be utilized, e.g., for probing the formation at various depths (an embodiment having multiple transmitter pairs is described in more detail below with respect to FIGS. 6 and 7).

With reference again to FIG. 3, transmitting antennae 132 and 134 are configured to transmit electromagnetic radiation (electromagnetic waves) at mutually distinct frequencies. This may be accomplished, for example, by connecting the antennae to appropriate transmitter circuits. Suitable transmitter circuits may include, for example, an oscillator that provides a predetermined alternating current signal (having a predetermined frequency or frequencies) and thereby enable the antennae to transmit electromagnetic signals at one or more frequencies (e.g., in the range from about 0.05 to about 2 MHz). In particular, first and second transmitters 132 and 134 are configured to transmit electromagnetic radiation at corresponding first and second frequencies $f_1$ and $f_2$ such that: $f_1/f_2 = L_2^{2/L_1^2}$, wherein $L_1$ and $L_2$ represent the axial distances between the first and second transmitting antennae 132 and 134 and the receiving antenna 122.

Aspects of the present invention advantageously enable the anisotropy effect to be significantly reduced (or substantially eliminated) using first and second asymmetrically positioned transducers (e.g., as depicted on FIG. 3). It is well known that the $H_{zx}$ cross-component in a homogeneous, anisotropic medium may be expressed mathematically as follows:

$$H_{zx} = \frac{M}{4\pi L^3}\left[\frac{\cos\theta}{\sin\theta}ik_h L(e^{ik_h L} - e^{i\beta k_h L})\right] \qquad \text{Equation 1}$$

where M represents the transmitter moment, L represents the axial distance between the transmitter and receiver, θ represents the relative dip angle, and $k_h$ represents the wave number corresponding to the horizontal resistivity such that: $k_h = \sqrt{i\omega\mu\sigma_h}$, where ω represents the frequency of the transmitted electromagnetic radiation in units of radians, μ represents the magnetic permeability, and $\sigma_h$ represents the horizontal component of the formation conductivity. The parameter β is related to the horizontal and vertical components of the formation conductivity and may be expressed mathematically as follows: $\beta = \sqrt{1+(\sigma_v/\sigma_h-1)\sin^2\theta}$, where θ and $\sigma_h$ are as defined above and $\sigma_v$ represents the vertical component of the formation conductivity.

One aspect of the present invention is the realization that Equation 1 can be rearranged as follows:

$$L^3 \cdot H_{zx} = \frac{M}{4\pi} \left[ \frac{\cos\theta}{\sin\theta} ik_h L(e^{ik_h L} - e^{i\beta k_h L}) \right]$$ Equation 2 and that the right side of Equation 2 produces the same response when the properties of two measurement systems obey the following constraint:

$$\omega_1 \mu_1 \sigma_{h1} L_1^2 = \omega_2 \mu_2 \sigma_{h2} L_2^2$$ Equation 3

Assuming the medium (the subterranean formation) properties to be the same (or nearly the same) for both transmitters, i.e., $\mu_1 \sigma_{h1} = \mu_2 \sigma_{h2}$, the constraint in Equation 3 simplifies to $f_1 L_1^2 = f_2 L_2^2$. Therefore, for an asymmetric system such as that depicted on FIG. 3, the quantities $L_1^3 \cdot H_{zx1}$ and $L_2^3 \cdot H_{zx2}$ are substantially equal when $f_1 L_1^2 = f_2 L_2^2$ (i.e., when $f_1/f_2 = L_2^2/L_1^2$). While the assumption that the medium properties are nearly the same is often valid, it will be appreciated by those of skill in the art that in certain applications the average medium properties (formation properties) may depend on the frequency of the electromagnetic radiation. For example, it is well known in the art that low frequency radiation penetrates the formation more deeply than high frequency radiation. As such, in preferred embodiments of the invention the first and second frequencies are within a factor of about 10 of one another (i.e., $f_2/10 \leq f_1 \leq 10 f_2$), so as to reduce formation property differences.

Figure 4:
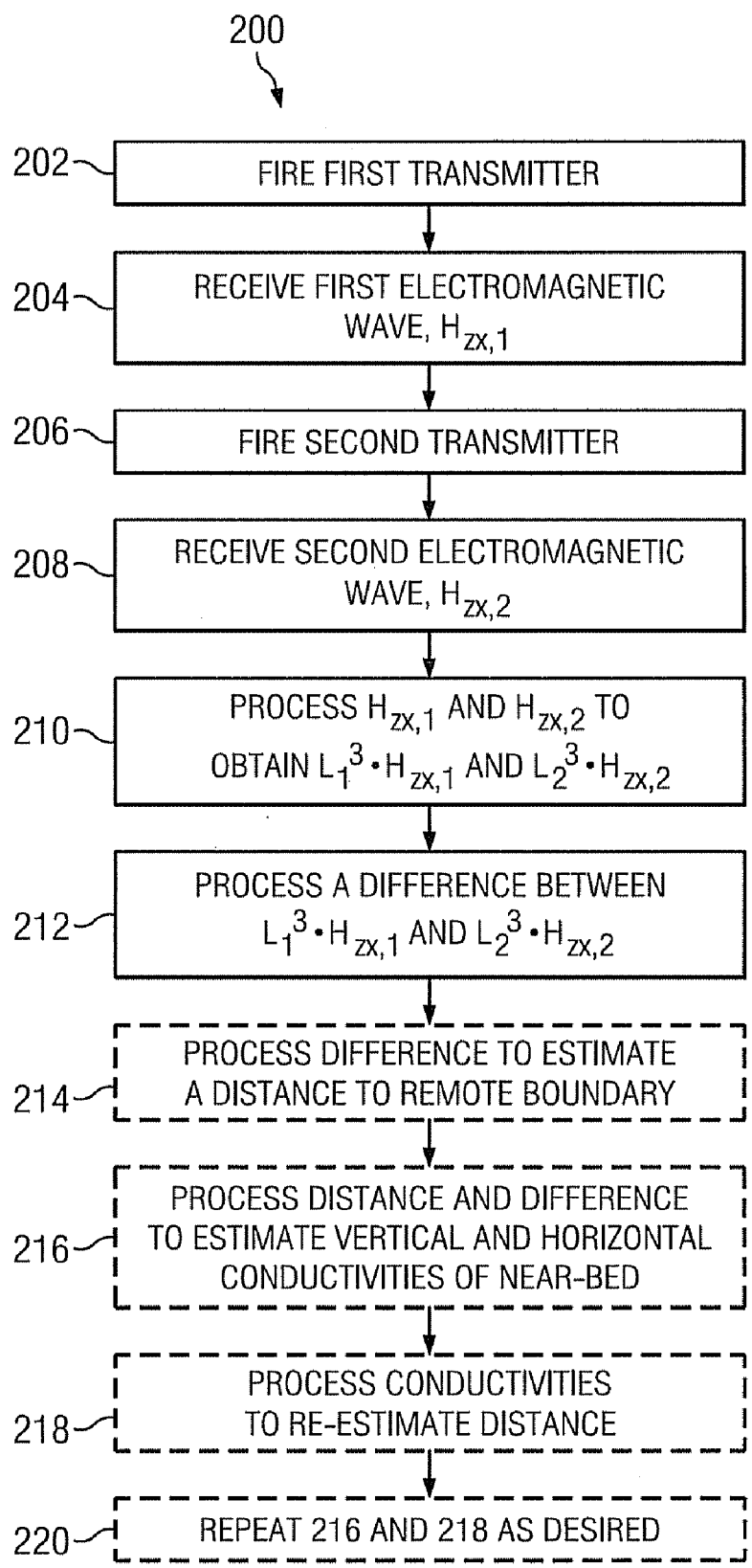
FIG. 4 depicts one exemplary method embodiment in accordance with the invention in flow chart form.

With continued reference to FIG. 3, and further reference now to FIG. 4, one aspect of the present invention is a method 200 for removing the near-bed anisotropy effect from directional resistivity measurements. At steps 202 and 206, the first and second transmitters 132 and 134 are fired sequentially at the corresponding first and second frequencies $f_1$ and $f_2$. The invention is not limited by the order of transmitter firing. Either the near or far transmitter (respectively transmitters 132 and 134) may be fired first. Corresponding magnetic fields are measured at the receiver 122 at steps 204 and 208. These magnetic fields provide a measure of the corresponding cross-component magnetic fields induced in the formation ($H_{zx1}$ and $H_{zx2}$). At step 210, each of the cross-components $H_{zx1}$ and $H_{zx2}$ is multiplied by the cube of the axial spacing between the respective transmitter and receiver ($L_1^3$ and $L_2^3$) to obtain the quantities $L_1^3 \cdot H_{zx1}$ and $L_2^3 \cdot H_{zx2}$. The anisotropy effect (the near-bed response) may then be removed (or significantly reduced) at step 212 by processing a difference between $L_1^3 \cdot H_{zx1}$ and $L_2^3 \cdot H_{zx2}$. While the invention is described above with respect to a sequential firing of the transmitters, it will be appreciated that the invention is not limited in this regard.

After processing the difference in step 212 (and thereby removing or significantly reducing the contribution of near-bed anisotropy), the processed response (i.e., the difference between $L_1^3 \cdot H_{zx1}$ and $L_2^3 \cdot H_{zx2}$) may be optionally further processed to estimate the distance to the remote bed (assuming there is a remote bed in sensory range of the directional resistivity measurements) and the conductivity of the remote bed. This may be accomplished, for example, at 214 by assuming an isotropic near-bed and computing conductivities of the near and remote beds and the distance from the resistivity tool to the remote bed using techniques known to those of ordinary skill in the art. At 216, the distance and remote bed conductivity estimated at 214 may be further processed in combination with $L_1^3 \cdot H_{zx1}$ and $L_2^3 \cdot H_{zx2}$ to calculate vertical and horizontal conductivities of the near-bed as well as a dip angle of the near-bed. At 218, the vertical and horizontal conductivities as well as the dip angle estimated in 216 may be further processed in combination with $L_1^3 \cdot H_{zx1}$ and $L_2^3 \cdot H_{zx2}$ to recalculate the distance to the remote bed and the remote bed conductivity. At 220, method steps 216 and 218 may be repeated iteratively as often as is necessary to converge on a solution for any or all of the formation parameters of interest (e.g., remote bed conductivity, near-bed vertical and horizontal conductivities, near-bed dip angle, and the distance between the measurement tool and the remote bed).

Figure 5A:
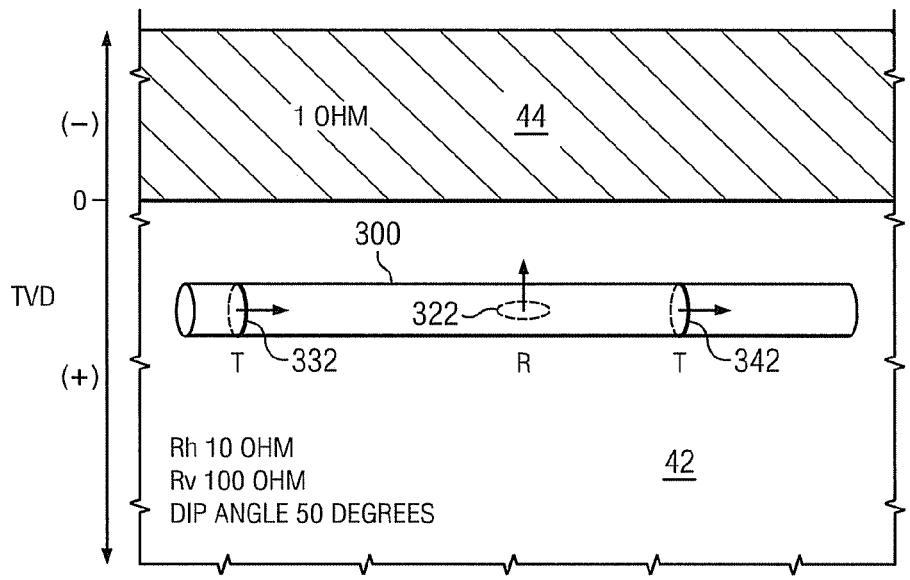
FIGS. 5A and 5B depict a hypothetical example in which a measurement tool in accordance with the present invention is deployed in a subterranean formation.
Figure 5B:
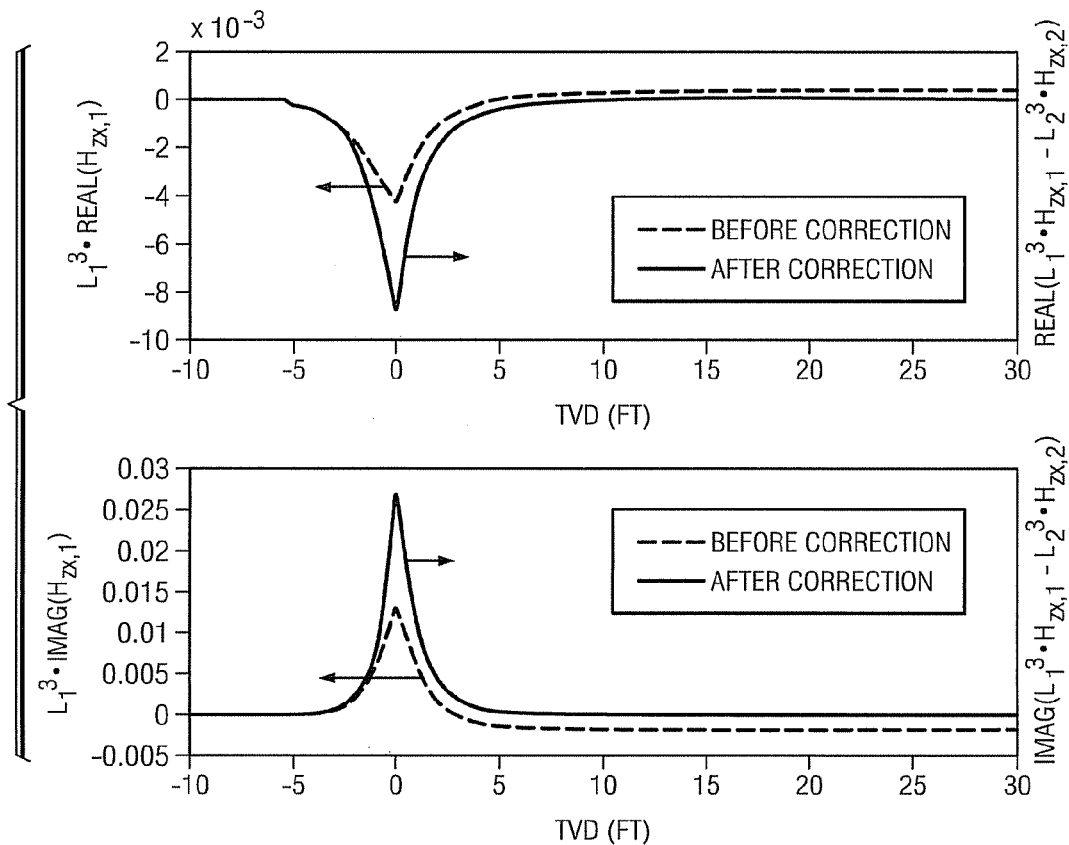

To further illustrate exemplary aspects of the invention, FIGS. 5A and 5B, depict a hypothetical example in which a measurement tool 300 in accordance with the invention is deployed in a subterranean formation. In the exemplary embodiment depicted, measurement tool 300 includes a transverse receiver 322 deployed axially asymmetrically between first and second axial transmitters 332 and 334. The first transmitter 332 is configured to transmit electromagnetic waves at a frequency of 98.8 kHz and is spaced a distance of 45 inches from the receiver 322. The second transmitter 334 is configured to transmit electromagnetic waves at a frequency of 500 kHz and is spaced a distance of 20 inches from the receiver 322. Measurement tool 300 is deployed in an anisotropic near-bed 42 having a horizontal resistivity of 10 ohm·m, a vertical resistivity of 100 ohm·m and a dip angle of 50 degrees. A remote bed 44 having a resistivity of 1 ohm·m is located above the near-bed as depicted. The boundary between the near and remote beds is arbitrarily defined to be at zero total vertical depth (TVD). Thus, as shown, the measurement tool 300 has a positive vertical depth when located in the near-bed 42.

FIG. 5B depicts a theoretical plot of the real and imaginary portions of $L_1^3 \cdot H_{zx1}$ and $L_1^3 \cdot H_{zx1} - L_2^3 \cdot H_{zx2}$ as a function of TVD for the hypothetical model depicted on FIG. 5A. The dashed line depicts the long transmitter response ($L_1^3 \cdot H_{zx1}$), while the solid line depicts the corrected response ($L_1^3 \cdot H_{zx1} - L_2^3 \cdot H_{zx2}$). As described above with respect to FIG. 4, the corrected response is intended to significantly reduce (or remove) the near-bed response (the anisotropy effect). The removal of the near-bed response can be most clearly observed at higher depths (e.g., TVD greater than about 5 feet) where there is little or no remote bed response. At such depths, removal of the near-bed response results in essentially zero response (as expected).

With continued reference to FIGS. 5A and 5B, those of skill in the art will readily appreciate that a directional resistivity tool does not generate a curve (or curves) as depicted on FIG. 5B, but rather one or more data points representative of a single TVD (depending on the tools location in the formation). The tool response at that depth may then be processed as described in more detail above with respect to FIG. 4 so as to remove the anisotropy effect and estimate various formation parameters and the distance of the tool from the bed boundary.

While measurement tool 100 is described above with respect to geosteering applications, it will also be understood that the invention is not limited in this regard. Nor is the invention limited to measurement while drilling (MWD) and/or logging while drilling (LWD) embodiments. Measurement tools in accordance with the present invention (having a pair of transmitters asymmetrically spaced about at least one receiver) may also be configured for use in wireline applications.

Aspects of the invention have been described above (in FIGS. 3-5) with respect to one exemplary tool embodiment having first and second transmitters deployed asymmetrically about a single receiver. It will be understood that the invention is in no way limited in these regards. Tool embodiments in accordance with the invention may include one or more pairs of transmitters deployed asymmetrically about one or more axially spaced receivers.

Figure 6:
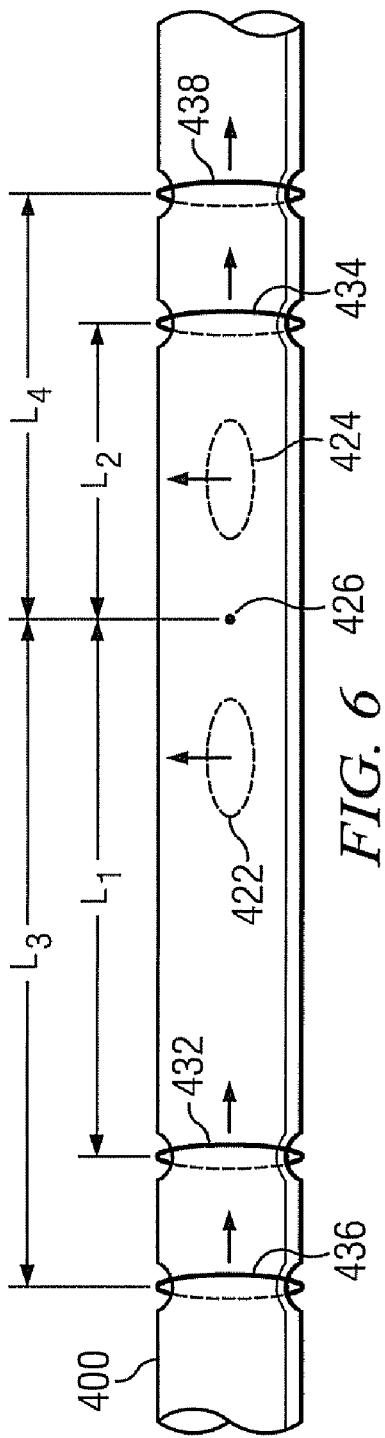
FIG. 6 depicts another exemplary embodiment of a directional resistivity tool in accordance with the present invention.
Figure 7:
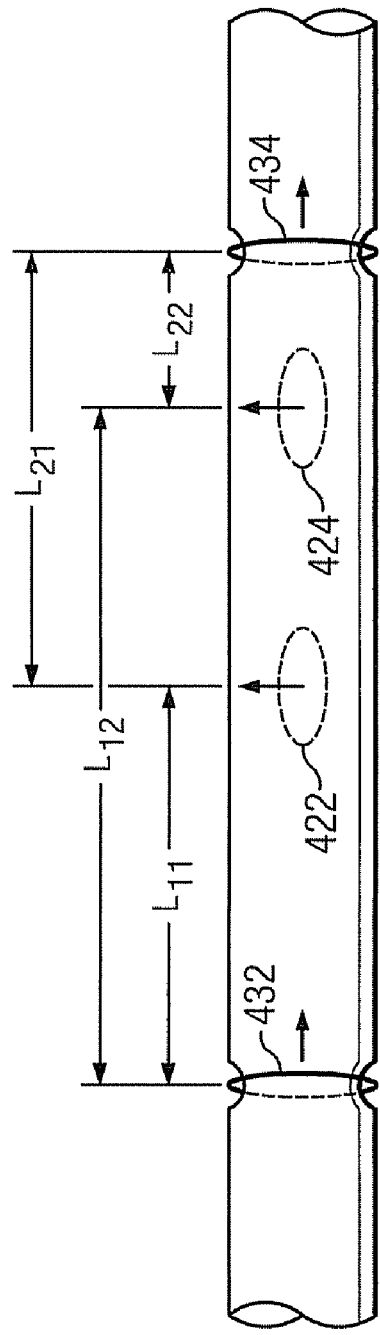
FIG. 7 depicts a portion of the tool embodiment shown on FIG. 6.

With reference now to FIG. 6, another exemplary embodiment of a measurement tool 400 in accordance with the present invention is depicted. In the exemplary embodiment shown, measurement tool 400 includes first 432 and 434 and second 436 and 438 pairs of axial transmitting antennae deployed axially asymmetrically about first and second axially spaced receiving antennae 422 and 424. In the exemplary embodiment depicted, transmitting antenna 432 is axially spaced from a predetermined point 426 located axially between the receiving antennae 422 and 424 by a distance $L_1$, while transmitting antenna 434 is axially spaced from point 426 by a distance $L_2$. Transmitting antenna 436 is axially spaced from point 426 by a distance $L_3$, while transmitting antenna 438 is axially spaced from point 426 by a distance $L_4$. In the exemplary embodiment shown $L_1/L_2=L_3/L_4$, although the invention is not limited in this regard.

As described above with respect to FIG. 3, transmitting antennae 432 and 434 may be configured to transmit electromagnetic radiation at distinct frequencies. Likewise, transmitting antennae 436 and 438 may also be configured to transmit electromagnetic radiation at correspondingly distinct frequencies. In a preferred embodiment transmitting antennae 432 and 436 are configured to transmit electromagnetic radiation at a first frequency and transmitting antennae 434 and 438 are configured to transmit electromagnetic radiation at a second frequency. In particular, transmitting antennae 432 and 436 are preferably configured to transmit electromagnetic radiation at a first frequency $f_1$ and transmitting antennae 434 and 438 are preferably configured to transmit electromagnetic radiation at a second frequency $f_2$ such that: $f_1/f_2=L_2^2/L_1^2=L_4^2/L_3^2$.

For tool embodiments including two or more receivers an average (or a weighted average) of the measured magnetic fields from the multiple receiving antennae 422 and 424 is typically calculated prior to applying method steps 210 and 212 in method 200 (FIG. 4). A straight average may be used when point 426 is symmetrically positioned between the receivers 422 and 424. Otherwise, a weighted average is preferably utilized. A weighted average of the multiple magnetic fields from the corresponding multiple receivers may be calculated to yield a single, virtual receiver response as follows:

$$H_{zx} = \sum_{i=1,N} w_i H_{zx,i} \qquad \text{Equation 4}$$

where $H_{zx}$ is as defined above, N represents the number of receiving antennae, i represents an integer from 1 to N, $H_{zx,i}$ represents the magnetic field of the ith receiving antenna, and $w_i$ represents the weighting factors, where $$\sum_{i=1,N} w_i = 1.$$

Those of skill in the art will readily appreciate that the magnetic fields at receivers 422 and 424 need not be averaged. This is described in more detail with respect to FIG. 7 for the exemplary tool embodiment 400 depicted on FIG. 6 (transmitting antennae 436 and 438 are not shown on FIG. 7 for clarity). Transmitting antenna 432 may be configured to transmit a waveform having first and second frequency components $f_{11}$ and $f_{12}$, while transmitting antenna 434 may be configured to transmit a waveform having distinct third and fourth frequency components $f_{21}$ and $f_{22}$. Frequency components $f_{11}, f_{12}, f_{21}$, and $f_{22}$ may be selected such that $f_{11}/f_{21}=L_{21}^2/L_{11}^2$ and $f_{12}/f_{22}=L_{22}^2/L_{12}^2$. In a general embodiment with arbitrary transmitter and receiver spacing, two distinct frequencies are required for each receiver. However, it will be appreciated that the transmitter and receiver spacing may be configured so as to reduce the number of distinct frequencies required. For example, in the exemplary embodiment depicted on FIG. 7, the transmitter and receiver spacing may be configured such that $L_{11}=L_{21}$. The result is a tool configuration in which only three distinct frequencies ($f_{11}$, $f_{12}$, and $f_{22}$) are required. It will be understood that in general the transmitter and receiver spacing may be configured such that n+1 frequencies are required for a tool embodiment having n axially spaced receivers.

Measurement tools in accordance with the present invention commonly include one or more digital controllers (not shown) having, for example, a programmable processor (not shown), such as a microprocessor or a microcontroller, and may also include processor-readable or computer-readable program code embodying logic, including instructions for controlling the function of the measurement tool. A suitable controller may include instructions for include determining the attenuation and/or phase shift of received radiation and for calculating and/or estimating values for the resistivity and/or dielectric constant of a formation from the attenuation and/or phase shift. Such instructions are conventional in the prior art.

A suitable controller may also be configured, for example, to implement at least a portion of method 200. The controller may therefore be configured to cause the transmitters to sequentially fire and the receiver to receive the corresponding signals. The controller may also be configured to process a difference between the received signals as described above with respect to FIG. 4.

A suitable controller may also optionally include other controllable components, such as sensors, data storage devices, power supplies, timers, and the like. The controller may also be disposed to be in electronic communication with various sensors and/or probes for monitoring physical parameters of the borehole, such as a gamma ray sensor, a depth detection sensor, or an accelerometer, gyro or magnetometer to detect azimuth and inclination. A controller may also optionally communicate with other instruments in the drill string, such as telemetry systems that communicate with the surface. A controller may further optionally include volatile or non-volatile memory or a data storage device.

A suitable controller typically also includes conventional electronics utilized in transmitting and/or receiving an electromagnetic waveform. A suitable transmitter circuit may include, for example, an oscillator that provides a predetermined alternating current signal and thereby enables the antenna to transmit electromagnetic signals at one or more frequencies (e.g., in the range from about 0.05 to about 2 MHz). Multiple frequencies may be employed at each transmitter to yield a greater quantity of information.

A suitable receiver circuit may include, for example, circuitry configured for receiving and amplifying signals detected by the antenna. A suitable receiver may further include an A/D converter for converting the received analog signal to a digital signal. A suitable processor may further process the received signals to remove the anisotropy effect as described above with respect to FIG. 4. The processor may further be configured to provide estimates of one or more formation parameters of interest, such as the resistivity and/or dielectric constant of the formation.

Although the present invention and its advantages have been described in detail, it should be understood that various changes, substitutions and alternations can be made herein without departing from the spirit and scope of the invention as defined by the appended claims.

I claim:

1. A downhole measurement tool comprising:
   a tool body having a longitudinal axis;
   a first pair of transmitting antennae deployed about the tool body, the pair including first and second transmitting antennae;
   a receiving antenna deployed about the tool body, the receiving antenna deployed axially asymmetrically between the pair of transmitting antenna; and
   the first and second transmitting antenna configured to transmit electromagnetic waves at correspondingly distinct first and second frequencies such that $f_1/f_2=L_2^2/L_1^2$, wherein $f_1$ and $f_2$ represent the first and second frequencies and $L_1$ and $L_2$ represent axial distances between the receiver antenna and the first and second transmitter antennae.

2. The downhole measurement tool of claim 1, wherein the receiving antenna comprises a tilted antenna or a transverse antenna.

3. The downhole measurement tool of claim 1, wherein at least one of the transmitting antennae and the receiving antenna comprises a non-planar antenna.

4. The downhole measurement tool of claim 1, wherein at least one of the transmitting antennae comprises an axial transmitter.

5. The downhole measurement tool of claim 1, wherein the first and second frequencies $f_1$ and $f_2$ are in a range from about 10 kHz to about 2 MHz.

6. The downhole measurement tool of claim 1, wherein: $f_2/10 \leq f_1 \leq 10 \cdot f_2$.

7. The downhole measurement tool of claim 1, further comprising a controller, the controller configured to: (i) cause the transmitting antennae to transmit corresponding first and second electromagnetic waves; (ii) cause the receiving antenna to measure a magnetic field corresponding to each of the transmitted electromagnetic waves, and (iii) compute a difference between the measured magnetic fields.

8. The downhole measurement tool of claim 7, wherein the difference between the measured magnetic fields is computed according to the equation: $L_1^3 \cdot H_{zx1} - L_2^3 \cdot H_{zx2}$, wherein $H_{zx1}$ and $H_{zx2}$ represent the measured magnetic fields corresponding to the first and second electromagnetic waves.

9. The downhole measurement tool of claim 1, comprising a plurality of pairs of transmitting antennae, each of the pairs deployed axially asymmetrically about the receiver.

10. The downhole measurement tool of claim 1 comprising a plurality of axially spaced receiving antennae deployed between the transmitting antennae.

11. A downhole measurement tool comprising:
    a tool body having a longitudinal axis;
    first and second axially spaced receiving antennae deployed about the tool body;
    a first pair of transmitting antennae deployed about the tool body, the first pair including first and second transmitting antennae deployed axially asymmetrically about a predetermined location between the first and second receiving antennae; and
    the first transmitting antenna configured to transmit electromagnetic waves at a first frequency and the second transmitting antenna configured to transmit electromagnetic waves at a second frequency such that $f_1/f_2=L_2^2/L_1^2$, wherein $f_1$ and $f_2$ represent the first and second frequencies and $L_1$ and $L_2$ represent axial distances between the first and second transmitting antennae and the predetermined location between the first and second receiving antenna.

12. The downhole measurement tool of claim 11, wherein the receiving antennae comprise tilted or transverse antennae.

13. The downhole measurement tool of claim 11, wherein at least one of the transmitting antennae and the receiving antenna comprises a non-planar antenna.

14. The downhole measurement tool of claim 11, wherein at least one of the transmitting antennae comprises an axial antenna.

15. The downhole measurement tool of claim 11, wherein the first and second frequencies $f_1$ and $f_2$ are in a range from about 10 kHz to about 2 MHz.

16. The downhole measurement tool of claim 11, wherein: $f_2/10 \leq f_1 \leq 10 \cdot f_2$.

17. The downhole measurement tool of claim 11, further comprising a controller, the controller configured to: (i) cause the transmitting antennae to transmit corresponding first and second electromagnetic waves; (ii) cause each of the receiving antennae to measure magnetic fields corresponding to the transmitted electromagnetic waves, (iii) compute an average or a weighted average of the magnetic fields measured at the first and second receiving antennae, and (iv) compute a difference between a first averaged field and a second averaged field.

18. The downhole measurement tool of claim 17, wherein the difference between the first averaged field and the second averaged field is computed according to the equation $L_1^3 \cdot H_{zx1} - H_{zx2}$, wherein $H_{zx1}$ and $H_{zx2}$ represent the first and second averaged fields.

19. The downhole measurement tool of claim 11, further comprising:
    a second pair of transmitting antennae deployed about the tool body, the second pair including third and fourth transmitting antennae deployed axially asymmetrically about the location between the first and second receiving antennae; and
    wherein the first and third transmitting antennae are configured to transmit electromagnetic waves at the first frequency and the second and fourth transmitting antennae are configured to transmit electromagnetic waves at the second frequency such that $f_1/f_2=L_2^2/L_1^2=L_4^2/L_3^2$, wherein $L_3$ and $L_4$ represent axial distances between the third and fourth transmitting antennae and the predetermined location between the first and second receiving antennae.

20. A downhole measurement tool comprising:
    a tool body having a longitudinal axis;
    first and second axially spaced receiving antennae deployed about the tool body;
    a first pair of transmitting antennae deployed about the tool body, the first pair including first and second transmitting antennae deployed axially asymmetrically about the first and second receiving antennae; and
    the first transmitting antenna configured to transmit electromagnetic waves having at least first and second frequency components and the second transmitting antenna configured to transmit electromagnetic waves having at least third and fourth frequency components such that $f_{11}/f_{21}=L_{21}^2/L_{11}^2$ and $f_{12}/f_{22}=L_{22}^2/L_{12}^2$, wherein $f_{11}$, $f_{12}$, $f_{21}$ and $f_{22}$ represent the first, second, third, and fourth frequencies components, $L_{11}$ and $L_{12}$ represent the axial distances between the first transmitting antenna and the first and second receiving antennae, and $L_{21}$ and $L_{22}$ represent the axial distances between the second transmitting antenna and the first and second receiving antennae.

21. The downhole measurement tool of claim 20, wherein the receiving antennae comprise tilted or transverse antennae.

22. The downhole measurement tool of claim 20, wherein at least one of the transmitting antennae and the receiving antenna comprises a non-planar antenna.

23. The downhole measurement tool of claim 20, wherein at least one of the transmitting antennae comprises and axial antenna.

24. The downhole measurement tool of claim 20, wherein the first, second, third, and fourth frequency components are in a range from about 10 kHz to about 2 MHz.

25. The downhole measurement tool of claim 20, further comprising a controller, the controller configured to: (i) cause the transmitting antennae to transmit corresponding first and second electromagnetic waves; (ii) cause each of the receiving antennae to measure magnetic fields corresponding to the transmitted electromagnetic waves, and (iii) compute a difference between first and second measured magnetic fields.

26. The downhole measurement tool of claim 20, wherein $L_{12}=L_{21}$ and $f_{12}=f_{21}$.

27. The downhole measurement tool of claim 20, further comprising a second pair of transmitting antennae deployed about the tool body, the second pair including third and fourth transmitting antennae deployed axially asymmetrically about the first and second receiving antennae.

28. A method of making directional resistivity measurements in a subterranean borehole, the method comprising:
  (a) rotating a directional resistivity tool in the borehole, the directional resistivity tool including a receiving antenna deployed axially between first and second transmitting antennae, the first and second transmitting antennae being asymmetrically spaced about the receiver such that $L_1 \neq L_2$, wherein $L_1$ and $L_2$ represent axial distances between the receiving antenna and the corresponding first and second transmitting antennae;
  (b) causing the first and second transmitting antennae to transmit first and second electromagnetic waves at corresponding first and second distinct frequencies $f_1$ and $f_2$ such that $f_1/f_2 = L_2^2/L_1^2$; and
  (c) causing the receiving antenna to measure first and second magnetic fields corresponding to the first and second electromagnetic waves.

29. The method of claim 28, further comprising:
  (d) processing a difference between the first and second magnetic fields measured in (c).

30. The method of claim 29, wherein the difference between the first and second magnetic fields is computed according to the equation $L_1^3 \cdot H_{zx1} - L_2^3 \cdot H_{zx2}$, wherein $H_{zx1}$ and $H_{zx2}$ represent the first and second magnetic fields.

31. The method of claim 30, further comprising:
  (e) processing the difference between the first and second magnetic fields to estimate a distance between the resistivity tool and a remote boundary layer.

32. The method of claim 31, further comprising:
  (f) processing the distance estimate in (e) and the difference computed in (d) to estimate vertical and horizontal conductivities of a near bed.

33. The method of claim 28, wherein the directional resistivity tool comprises first and second axially spaced receiving antennae deployed asymmetrically between the transmitting antennae and (c) comprises causing each of the receiving antennae to measure first and second magnetic fields corresponding to the first and second electromagnetic waves, the method further comprising:
  (d) computing (i) a first average or a weighted average of the first magnetic fields at the first and second receiving antennae and (ii) a second average or a weighted average of the second magnetic fields at the first and second receiving antennae.

34. The method of claim 33, further comprising:
  (e) computing a difference between the first average or weighted average and the second average or weighted average.

* * * * *